(12) United States Patent
Mahmood et al.

(10) Patent No.: US 10,281,556 B2
(45) Date of Patent: May 7, 2019

(54) INTERFERENCE DETECTION AND REJECTION FOR WIDE AREA POSITIONING SYSTEMS

(71) Applicant: NextNav, LLC, Sunnyvale, CA (US)

(72) Inventors: Mir Hamza Mahmood, Mountain View, CA (US); Arun Raghupathy, Bangalore (IN); Andrew Sendonaris, Los Gatos, CA (US)

(73) Assignee: NextNav, LLC, Sunnyvale, CA (US)

( * ) Notice: Subject to any disclaimer, the term of this patent is extended or adjusted under 35 U.S.C. 154(b) by 328 days.

(21) Appl. No.: 15/288,524

(22) Filed: Oct. 7, 2016

(65) Prior Publication Data

US 2017/0248677 A1 Aug. 31, 2017

Related U.S. Application Data

(60) Provisional application No. 62/301,448, filed on Feb. 29, 2016, provisional application No. 62/301,456, filed on Feb. 29, 2016.

(51) Int. Cl.

| | |
|---|---|
| *G01S 5/02* | (2010.01) |
| *H04B 17/336* | (2015.01) |
| *H04L 5/00* | (2006.01) |
| *H04L 25/08* | (2006.01) |
| *H04W 52/24* | (2009.01) |
| *H04W 52/28* | (2009.01) |
| *H04B 17/318* | (2015.01) |
| *H04B 17/345* | (2015.01) |

(52) U.S. Cl.
CPC .......... *G01S 5/0215* (2013.01); *G01S 5/0252* (2013.01); *H04B 17/318* (2015.01); *H04B 17/336* (2015.01); *H04B 17/345* (2015.01); *H04L 5/006* (2013.01); *H04L 25/08* (2013.01); *H04W 52/243* (2013.01); *H04W 52/283* (2013.01)

(58) Field of Classification Search
CPC ... G01S 5/0215; G01S 5/0252; H04B 17/318; H04B 17/336; H04B 17/345; H04L 25/08; H04L 5/006; H04W 52/243; H04W 52/283
USPC .......................................................... 342/16
See application file for complete search history.

(56) References Cited

U.S. PATENT DOCUMENTS

| | | |
|---|---|---|
| 2005/0041725 A1 | 2/2005 | De Rivaz |
| 2009/0046792 A1 | 2/2009 | Xu |
| 2010/0279707 A1 | 11/2010 | Fischer |
| 2012/0099503 A1 | 4/2012 | Guo |
| 2015/0066492 A1* | 3/2015 | Bayer ................... G10L 19/002 704/207 |
| 2016/0156424 A1 | 6/2016 | Mirbagheri |
| 2016/0171965 A1 | 6/2016 | Arai |

* cited by examiner

*Primary Examiner* — Timothy A Brainard

(57) ABSTRACT

Detecting and mitigating the effects of interference in a positioning system. A received signal is divided into a plurality of receive signal time/frequency (RSTF) values. A plurality of threshold values are determined based on expected energy values for the received signal. In one implementation, if a predetermined number of the RSTF values are above the threshold, the received signal is determined to be corrupt.

20 Claims, 13 Drawing Sheets

INTERFERENCE DETECTION AND REJECTION FOR WIDE AREA POSITIONING SYSTEMS

TECHNICAL FIELD

This disclosure relates to interference tolerant receivers.

BACKGROUND

Positioning systems are widely used to estimate a receiver's location using positioning signals the receiver receives from one or more types of beacons (e.g. terrestrial transmitters or satellites). Positioning signals transmitted from satellites can have relatively low power levels, which makes those positioning signals susceptible to interference. By contrast, positioning signals from terrestrial transmitters often reach a receiver at higher power levels. However, the frequencies used to transmit such terrestrial positioning signals are not subject to the same use restrictions as more conventional positioning system signals like those from satellites. Therefore, there is a higher likelihood that other systems may be transmitting energy that appears as interference to a receiver that receives terrestrial positioning signals.

The presence of interfering signals in a frequency bandwidth of interest is a serious problem for receivers. In time-of-arrival (TOA) positioning systems, this problem poses a considerable threat to the quality of a position estimate made by the receiver. Equipment that emits weak signals within the passband used by receivers can be a major source of interference to a receiver, even when the interference may not have a predictable time and/or frequency pattern. If unsuppressed, such interference may severely compromise the integrity of the position estimate computed by the receiver as well as compromise other aspects of signal acquisition and system time synchronization. Therefore, it would be desirable to have an interference tolerant receiver.

SUMMARY

Various embodiments of a receiver having interference detection and rejection for wide area positioning systems are disclosed, as well as methods for interference detection and rejection for use in wide area positioning systems.

In some embodiments, a time-frequency spectrum of the received signal is computed. Time-frequency bins that have been corrupted by interference are detected. Detection of such interference is accomplished by measuring the amount of signal energy in each frequency bin across time. In most positioning systems, a transmit pulse shaping filter is used to restrict the transmitted signal energy to a certain bandwidth and to conform the transmitted signal to a particular shape. Such filters help control inter-symbol interference, as well as serving other purposes. Prior information about the shape of positioning signals and the distribution and variations of the energy of such signals over a time-frequency spectrum are used to assist an interference detector in detecting interference in real-time with minimal false alarms. Other techniques may be used when signals are not transmitted through a transmit pulse shaping filter. For example, a combination of non-linear filtering (such as median filtering) and measuring signal energy variations of the time-frequency spectrum may be used to determine the presence of interference. When interference is detected in a particular time-frequency bin, the received signal in that time period is not used to assist in estimating the position of the receiver. Alternatively, when interference is detected in a certain time-frequency bin, the received signal in that time period may be filtered to lessen or remove the interference. Alternatively, the received signal in that time period may be scaled so that the received signal in that time period has less influence on the result of a position estimation process. Accordingly, signals that are corrupted by interference do not degrade the performance of the positioning system.

In some embodiments, a vector entitled "ideal_energy_vec" includes a set of values, each of which represent the relative amount of energy that would be output from a pulse shaping filter in each of a plurality of relatively narrow frequencies (referred to as "frequency bins") in response to a reference signal being applied to the pulse shaping filter. The vector ideal_energy_vec may be initially used to determine a plurality of threshold values used to determine if a first time slot (e.g. "bit") of a received signal has been corrupted by interference. The term "bit" is used to indicate a time slot during which the power of a received signal is accumulated within the plurality of frequency bins. In some embodiments, subsequent bits of the received signal are used to update the threshold.

If one frequency bin is determined to have been corrupted by interference, the signal for all frequency bins over that entire bit may be discarded. That is, the time domain signal corresponding to the entire bit is discarded. In another embodiment, the identified interference is rejected using filtering techniques (e.g. a suppression filter). In yet another embodiment, a scaling factor is applied to an aspect of the signal. In yet another embodiment, if a frequency bin of a bit is found to be corrupted, then the values corresponding to the corrupted bit will not be used during integration of a correlation function. In yet another embodiment, only the corrupted frequency bin is discarded. In yet another embodiment, the number of previously identified corrupt bits or frequency bins are used to determine whether to discard the entire bit or just the corrupted frequency bin.

A scaling factor may be used to adjust the interference threshold values. In one embodiment, the scaling factor is a value greater than one. In addition, a composite (such as a mean) of the values for each frequency bin over several bits may be used as a reference to normalize interference threshold values. Additionally, the interference threshold values may be determined using a received signal of a duration corresponding to that of multiple bits before processing is started to determine the amount of interference in each bit/frequency bin. In some embodiments, a matrix, TF, of values, representing the power levels for the received signal at each frequency bin within each bit, is fully determined before processing is started to determine the amount of interference in each bit/frequency bin and then used to reject identified interference. Alternatively, interference detection is performed dynamically as the signal is received.

DETAILED DESCRIPTION

Figure 1:
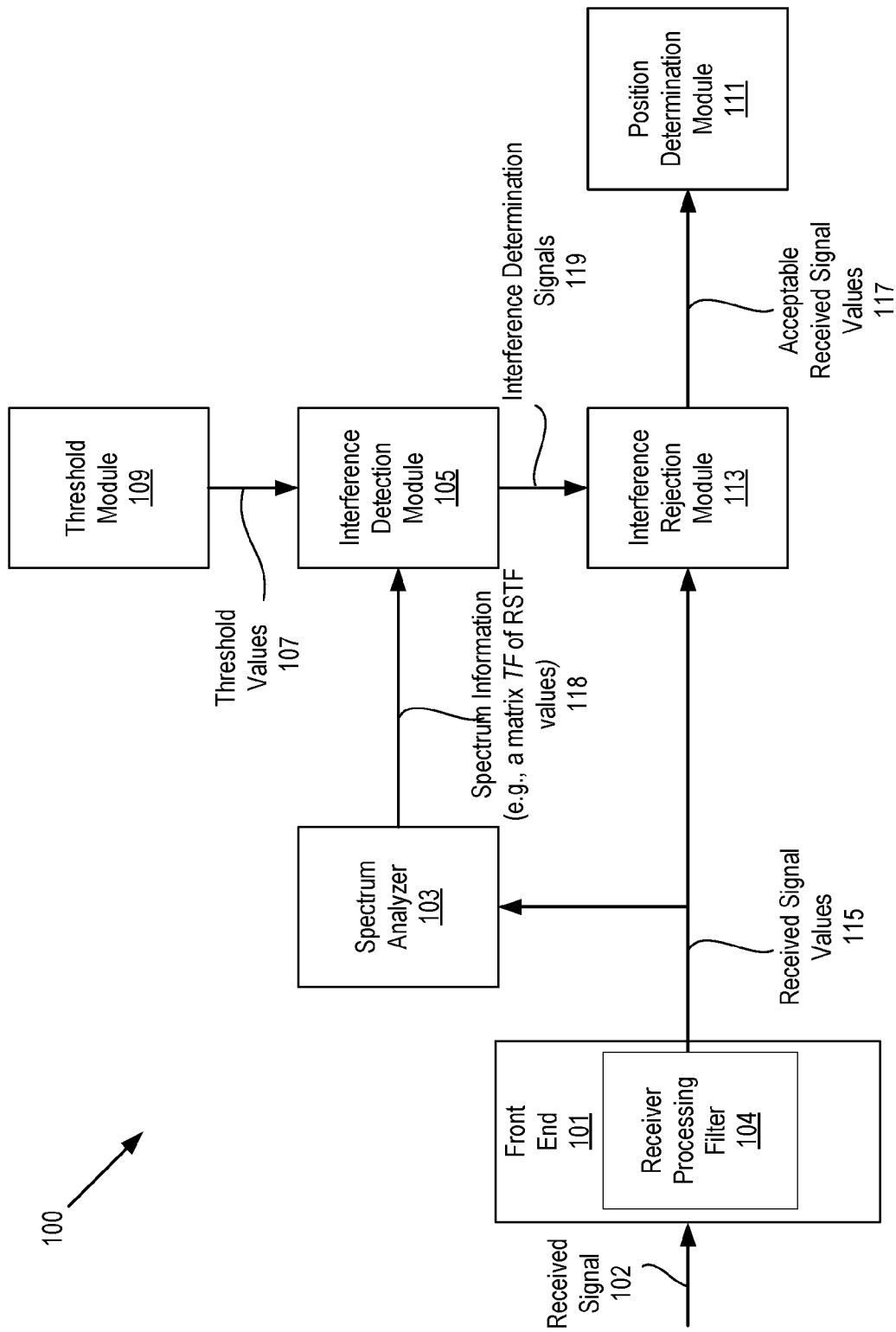
FIG. 1 provides a simplified block diagram of a receiver.

FIG. 1 provides a simplified block diagram of a receiver 100. The receiver 100 includes a front end 101. Received signals 102 are processed by the front end 101 to generate received signal values 115. The front end 101 generally includes a receiver processing filter 104 and one or more amplifiers (not shown). The front end may also include an analog to digital converter (ADC). Such amplifiers, ADCs and other filters (not shown) are known.

An output of the front end 101 is coupled to a spectrum analyzer 103 and an interference rejection module 113. The spectrum analyzer 103 can be implemented by any signal-processing device capable of detecting the relative amount of energy within discrete frequency bands (referred to herein as "bins") and over predetermined periods of time (referred to herein as "bits") to generate spectrum information 118. An output of the spectrum analyzer 103 is coupled to an input of an interference detection module 105.

Additionally, an output of a threshold module 109 is coupled to an input of the interference detection module 105. In one embodiment, the interference detection module 105 receives threshold values 107 from a threshold module 109. Details of the threshold module 109 are discussed later. The interference detection module 105 uses the spectrum information 118 to determine the degree to which interference is present in the received signal values 115. An output of the interference detection module 105 is coupled to an input of the interference rejection module 113.

The interference rejection module 113 can be implemented by any signal-processing device capable of blocking, removing or attenuating identified signal interference present in the received signal values 115 to generate and/or identify acceptable received signal values 117. Examples of signal processing capable devices include microprocessors, digital signal processors, ASICs, or dedicated custom or semi-custom hardware. An output of the interference rejection module 113 is coupled to an input of a position determination module 111. The position determination module 111 uses the acceptable received signal values 117 to generate an estimated position of the receiver system 100.

Signal Interference Detection and Rejection

Figure 2:
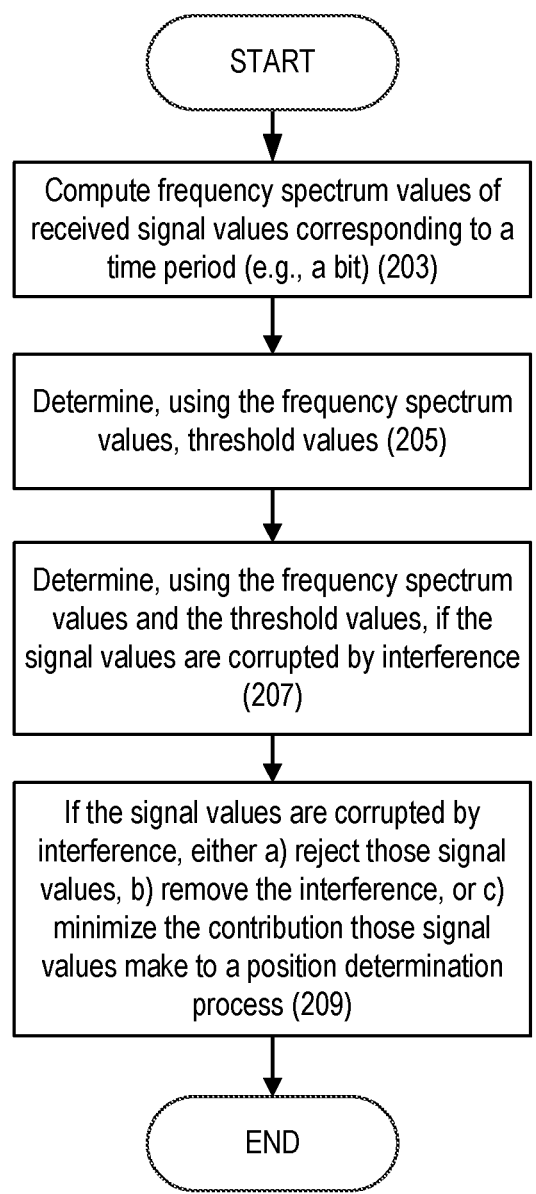
FIG. 2 depicts a process for detecting and rejecting signal interference.

FIG. 2 depicts a process for detecting and rejecting signal interference. The steps of the process include: computing frequency spectrum values (received signal time-frequency values) of received signal values corresponding to a time period (e.g. a bit) (203); determining, using the frequency spectrum values, threshold values (205); determining, using the frequency spectrum values and the threshold values, if the signal values are corrupted by interference (207); and, if the signal values are corrupted by interference, a) rejecting those signal values, b) removing the interference, or c) minimizing the contribution those signal values make to a position determination process (209). Details and discussion of these steps follow.

Determining Frequency Spectrum Values of Received Signal Values

As was discussed at FIG. 1, the spectrum analyzer 103 processes received signal values output by the positioning system front end 101. In one embodiment, the spectrum analyzer 103 divides the total frequency bandwidth of the received signal into K number of frequency bins. Such signal processing may occur at step 203 of FIG. 2.

In one embodiment, the signals received by the receiver 100 originate from a transmitter that is part of a direct sequence spread spectrum (DSS) TOA positioning system. Such positioning systems are known.

DSS TOA positioning systems employ a pseudorandom number (PN) sequence when generating a transmit signal. For a transmit signal that is modulated with a PN sequence $c_n(t)$, in which the sequence is repeated I times at a rate of once per bit, the $i^{th}$ bit of the transmit signal (not taking into account any noise that might exist in the signal) before transmission from the $n^{th}$ transmitter can be expressed as:

$$x_i^{(n)}(t) = c_n(t) * p(t), i=1,2,\ldots,I \quad (1)$$

where p(t) corresponds to the impulse response of a pulse shaping filter. Details of such pulse shaping filters are discussed later.

The wireless channel from the $n^{th}$ transmitter to the receiver 100 adds noise to the transmitted signal. After being transmitted over the channel and upon reception by the receiver front end 101, the signal $x_i^{(n)}(t)$ can be written as:

$$y_i^{(n)}(t) \quad (2)$$

A receiver processing filter 104 within the front end 101 processes the received signal. In one embodiment, the filter 104 has an impulse response h(t). The output of the front end 101 corresponding to a signal received from the $n^{th}$ transmitter can be written as:

$$O_i^{(n)}(t) = y_i^{(n)}(t) * h(t) \quad (3)$$

The spectrum analyzer 103 may divide the total frequency bandwidth of the received signal into K number of frequency bins. Thus, the time-frequency spectrum output of the spectrum analyzer can be written as the matrix:

$$TF = [F\{O_1^{(n)}(t)\} F\{O_2^{(n)}(t)\} \ldots F\{O_I^{(n)}(t)\}] \quad (4)$$

where $F\{x\}$ indicates an operation in which the signal energy for each frequency bin is determined and $F\{O_i^{(n)}(t)\}$ denotes a length K column vector whose $k^{th}$ element represents signal energy of $O_i^{(n)}(t)$ in the $k^{th}$ frequency bin. The resultant matrix TF represents the energy levels determined for each of the frequency bins k=1, 2, ... K within the bits i=1, 2, ... I. Details of the matrix TF are discussed later with reference to FIG. 4. In one embodiment, the spectrum analyzer 103 determines the signal energy of the received signal values 115. In one embodiment, each column vector of the matrix TF is generated using a K-point Discrete Frequency Transform (DFT). Since the columns of the matrix TF represent the time dimension and the rows represent the frequency dimension, each element of the matrix TF represents the signal energy for a particular bit i at a particular frequency k. In one embodiment, the spectrum analyzer 103 computes the time frequency spectrum or the matrix TF using a time duration smaller or larger than the time duration of a single bit. Details of selecting the number of frequency bins, K, and details of the matrix TF directly follow.

Details of Selecting the Number of Frequency Bins, K

Figure 3:
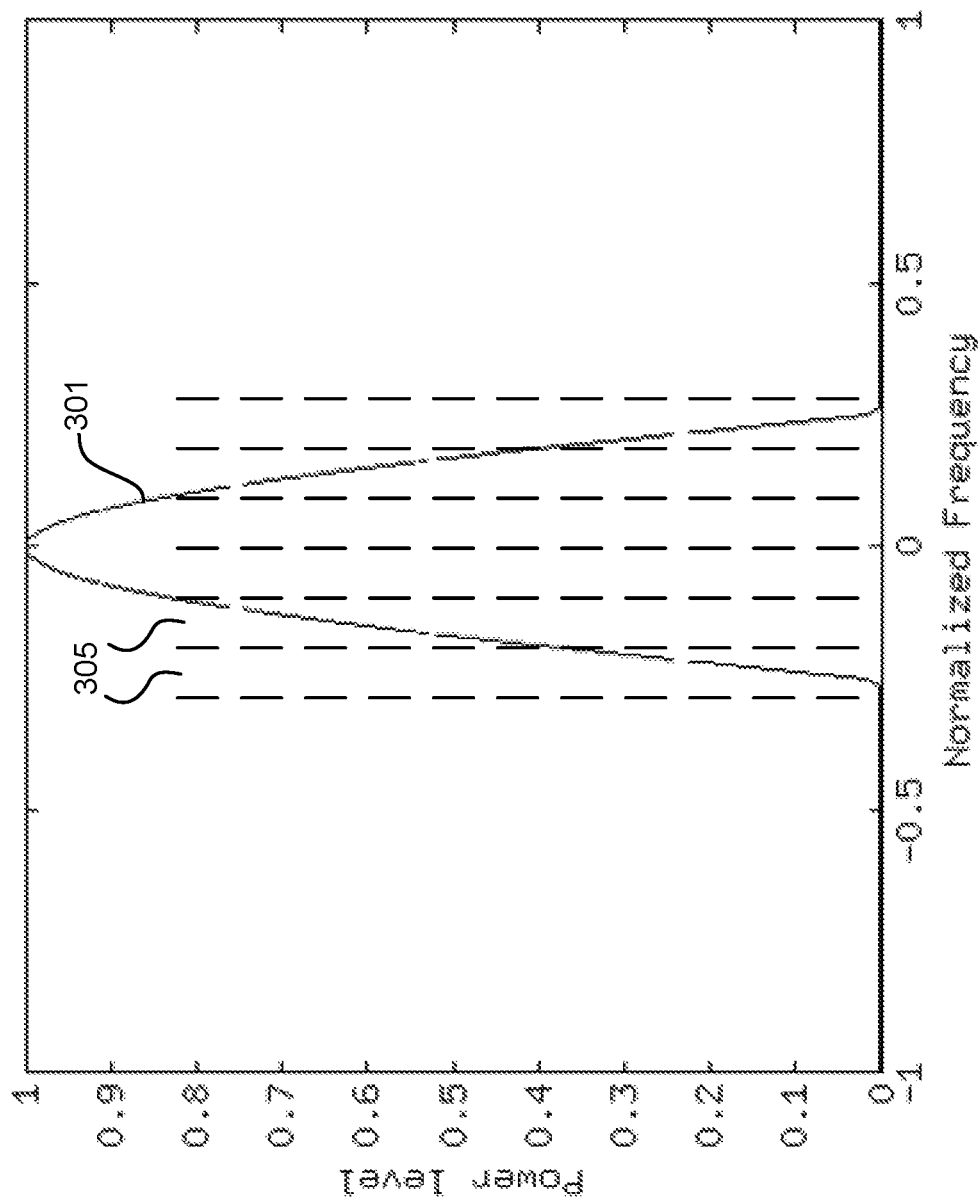
FIG. 3 plots a normalized frequency spectrum associated with a pulse shaping filter.

The transmitter that generated and transmitted the received signal 102 may include a transmit pulse shaping filter close to the output of the transmitter. FIG. 3 plots a normalized frequency spectrum 301 for a pulse shape of a pulse shaping filter.

In some embodiments, the transmit shaping filter is specified by an industry standard that controls the transmission of positioning signals. If the signal received at the front end 101 of the receiver 100 was shaped by such a pulse shaping filter prior to transmission, any difference between the shape imposed by the filter upon the transmit signal and the shape of the received signal will inherently be due to either (1) interference, or (2) distortion imposed on the signal by the channel over which the signal has been transmitted. In some embodiments, the receiver may include an equalizer to remove at least some of the distortions imposed by the channel.

As shown in FIG. 3, the normalized frequency spectrum bandwidth consumed by the output of the pulse shaping filter spans from approximately −0.25 to 0.25. In one embodiment, the spectrum analyzer 103 divides this signal spectrum of interest into K number of frequency bins 305. The spectrum analyzer 103 then computes the signal energy in each of the K frequency bins. In one embodiment, the frequency bins are not of equal width. In another embodiment, K corresponds to an arbitrary number of frequency bins.

The selection of K's value can be a function of the type of expected interferers, the choice of rejection method employed and the computational power available. That is, if rejection methods employed do not involve filtering, the spectrum analyzer 103 can select K as a function of the type of expected interferers and the computational power available. For example, the spectrum analyzer 103 can select a value of K such that the bandwidth of a frequency bin is roughly equal to the bandwidth of the expected interferer. If, however, after the it has been detected that a time-frequency bin is corrupted by interference, and the interference is to be filtered out, the choice of K could be selected based on the size of the suppression band of the interference suppression filter that can be realized. In some embodiments, the size K may be transmitted to the receiver by a server or another entity, or the size K may be determined in part by the location of the receiver.

Details of the Matrix TF

Figure 4:
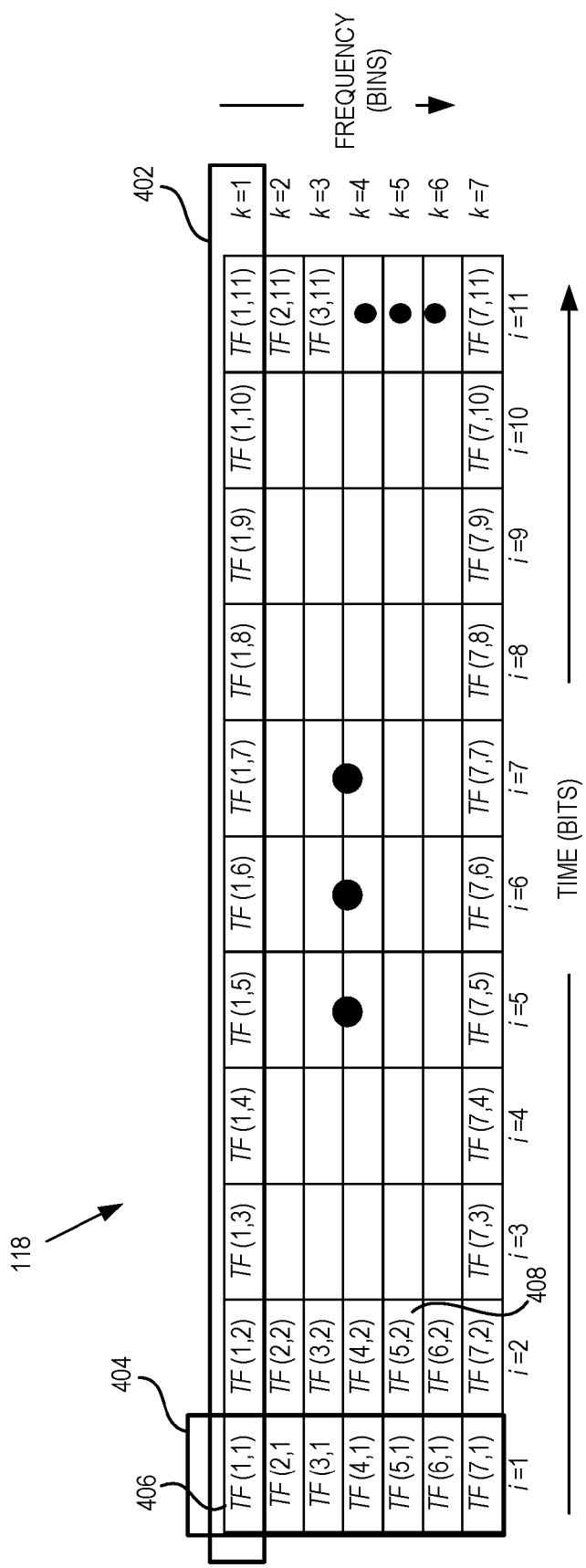
FIG. 4 illustrates a matrix TF of received signal time-frequency (RSTF) values.

FIG. 4 is an illustration of a matrix TF of received signal time-frequency (RSTF) values. As shown, each row 402 of the matrix TF represents a vector of identified signal energies within a particular frequency bin, k, for 1 through I=11. Each column 404 of the matrix TF 118 represents a vector of signal energy values within 1 through K=7 frequency bins for a particular bit, i. In some embodiments, the matrix TF is included in the spectrum information 118 of FIG. 1. As shown, element TF(1, 1) 406 represents an energy spectrum value for the first frequency bin during a time period corresponding to a first bit. Element TF(5, 2) 408 represents the energy spectrum value in the fifth frequency bin during a time period corresponding to a second bit. The interference detection module 105 compares the values of the matrix TF to predetermined threshold values (e.g. expected energy values) to determine if interference is present in the received signal values 115.

Determining Threshold Values

As discussed earlier, the interference detection module 105 receives threshold values 107 from a threshold module 109. In some embodiments, the threshold module 109 determines the threshold values based upon the frequency response of the transmit pulse shaping filter that is used by the transmitter responsible for generating and transmitting the signal received 102 by the receiver 100. In one embodiment, the transmit pulse shaping filter is a raised root cosine (RRC) filter. As is described, the threshold values may be subsequently updated using values of the matrix TF that correspond to acceptable received signals.

Figure 5:
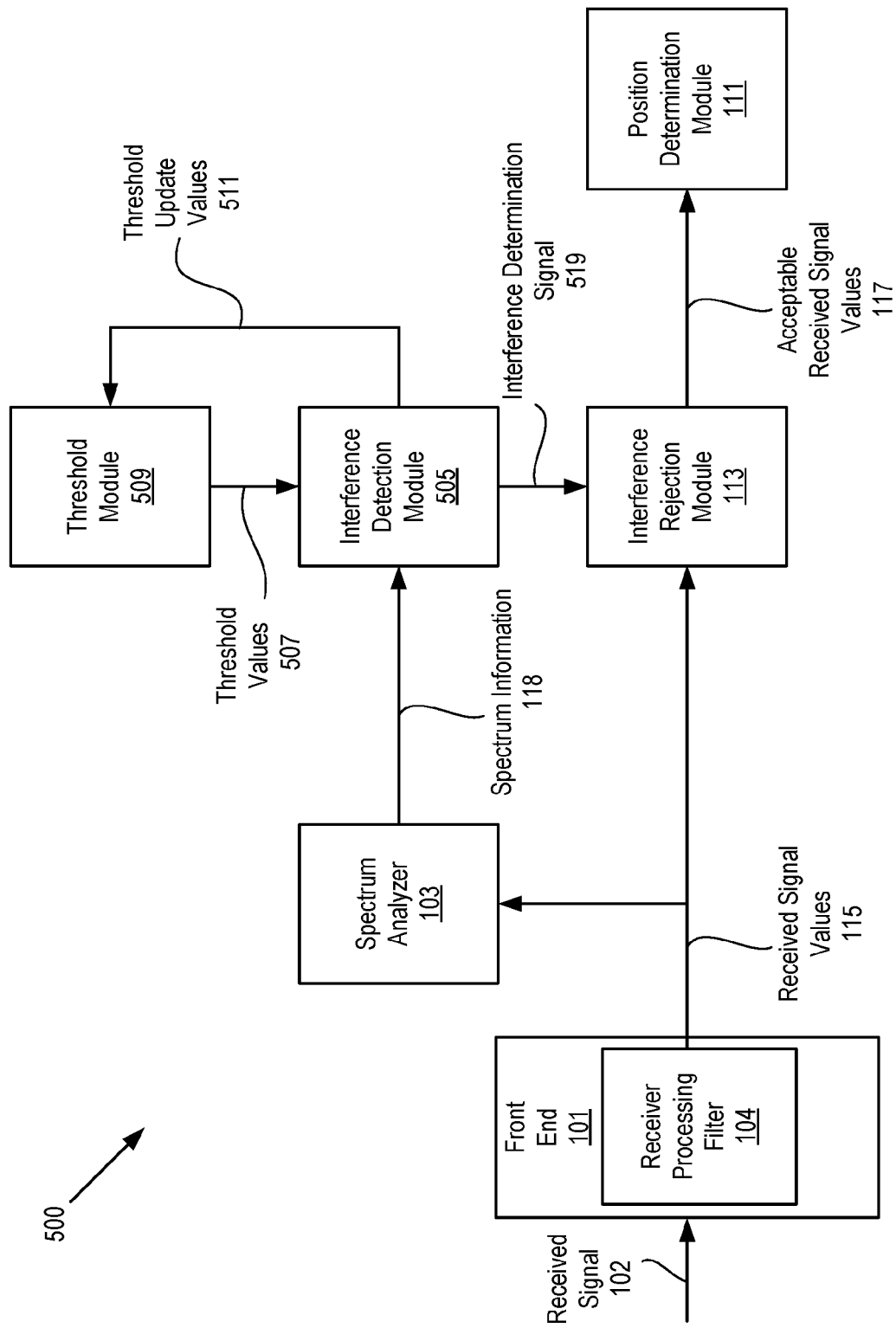
FIG. 5 depicts a block diagram of a receiver in which threshold update values output from an interference detection module are provided to a threshold module.
Figure 6:
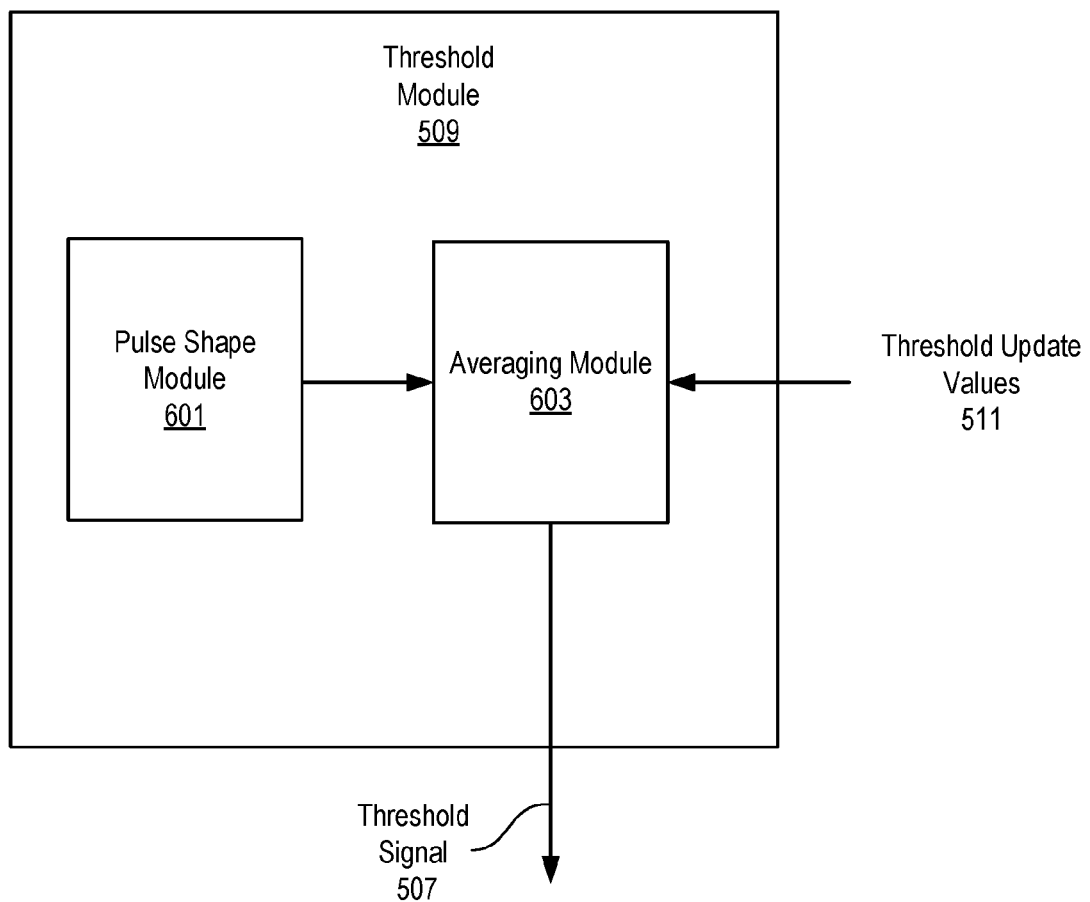
FIG. 6 illustrates a threshold module in greater detail.
Figure 7:
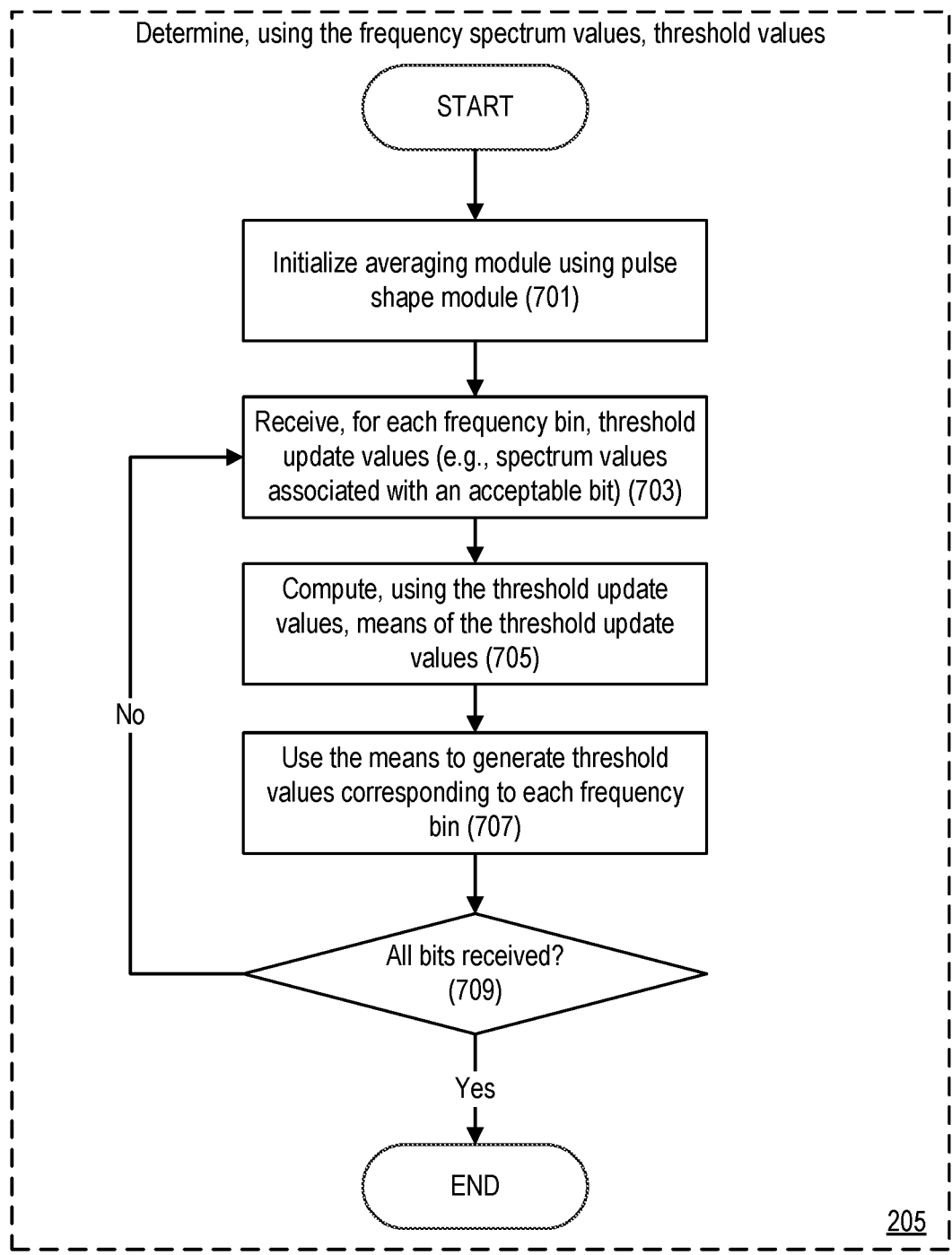
FIG. 7 depicts a process for determining threshold values.

By way of example, FIG. 5, FIG. 6 and FIG. 7 provide additional details of threshold value creation. FIG. 5 is a simplified block diagram of another embodiment of the disclosed receiver 500 in which threshold update values 511 output from an interference detection module 505 are provided to a threshold module 509. FIG. 6 illustrates the threshold module 509 in greater detail. FIG. 7 depicts a process for determining the threshold values 507.

As illustrated by FIG. 6, threshold values may initially be determined using energy spectrum information generated by a pulse shape module 601. The energy spectrum information output from the pulse shape module 601 is associated with the energy spectrum of the transmit pulse shape module located at a remote transmitter (not shown). In one embodiment, as the receiver system 100 receives new signals 102, energy spectrum information generating the received signals 102 is used to update the threshold values if the received signals are determined to be acceptable (e.g. not corrupted). In another embodiment, the threshold value for each frequency bin is set to a value that is a predetermined number of Decibels greater than an expected energy value associated with the frequency bin.

The pulse shape module 601 within the threshold module 509 provides information regarding the relative amount of energy ideally expected to be present in each frequency bin of a signal shaped by a pulse-shaping filter. In one embodiment, the pulse shape module 601 is loaded with information regarding the frequency response of a transmit pulse-shaping filter. This information is provided to an averaging module 603. In addition, the averaging module 603 receives threshold update values 511 from the interference detection module 505. In one embodiment, the threshold update values 511 include RSTF values (e.g. energy spectrum values of the matrix TF) corresponding to acceptable bits of the received signal. The threshold update values 511 provided from the interference detection module 505 are combined (e.g. averaged) with the values from the pulse shape module 601.

As illustrated by FIG. 7, when the first bit i=1 is being processed, there are no threshold update values 511 yet available for the interference detection module 505 to provide (or those values will be equal to zero). Therefore, the output of the averaging module 603 will initially be equal to the output of the pulse shape module 601 (701). Thereafter, the averaging module 603 will receive threshold update values 511 from the interference detection module 505 (703). Such threshold update values may include spectrum values associated with an acceptable bit. In response, the averaging module 603 will use the threshold update values 511 to compute a mean of the received threshold update values (e.g. a mean of spectrum values corresponding to each frequency bin) (705). Next, the threshold module 509 uses the mean provided by the interference detection module 505 to update the current threshold values 507 (707).

After processing of the first bit, the averaging module 603 may determine the average of all of the acceptable bits for the $k^{th}$ frequency bin independent of the output of the pulse shape module 601. The output of the pulse shape module 601 may be used in determining the threshold values 507, even after the first bit has been processed. The output of the pulse shape module 601 may be weighted to control the amount of influence the module's output will have on the threshold value 507. The output of the pulse shape module 601 may be no longer included in the determination of the threshold values 507 once there are column vectors corresponding to a sufficient number of bits.

The energy spectrum of the pulse shaping filter may be known within the pulse shape module 601. For the purpose of this discussion, the energy spectrum of the filter is the frequency response or other such characterization of the effect of the filter transfer function on signals applied to the filter. The energy spectrum may be loaded into the receiver 500 prior to the receiver 500 being put into service, or may be loaded and/or updated after the receiver 500 is placed in service.

In one embodiment, the averaging module 603 applies a scaling factor to the average of the threshold update values prior to outputting the threshold values 507. The scaling factor may be a value greater than one such that the scaling factor makes the interference detection module 505 less likely to detect interference and thus reduces the number of times interference is falsely detected. As shown at step 709, the process of FIG. 7 is repeated for each bit until all bits have been processed.

Interference Determination Initialization

The interference detection module 105 detects variations in the signal energy across time and frequency that surpass threshold values corresponding to corresponding frequency bins. Such variations can be indicative of interference and/or other signal distortions. Such interference can move across frequency and/or time (e.g. be frequency and/or time "hopping"). Accordingly, the interference can be present for a short period of time in any one particular frequency and may move between different frequencies over time. The particular frequency and/or time hopping pattern may not be known.

Upon determining the energy spectrum values of the received signal during a period of time (e.g. a bit) for each of the frequency bins, K, the energy spectrum values are compared to threshold values as part of the interference determination process. Such threshold values are created at step 205 of FIG. 2.

At step 207, the frequency bins within the $i^{th}$ column vector of the matrix TF are evaluated to determine which frequency bins do not satisfy test criteria (e.g. surpass the threshold values 107). If frequency bins within the $i^{th}$ column vector of the matrix TF do not satisfy the test criteria, it is then determined whether the entire bit i is corrupted by interference. By way of example, FIG. 8 through FIG. 11 provide details of step 207, in which received signal frequency spectrum values and the generated threshold values are used to determine if the received signal values are corrupted by interference.

Figure 8:
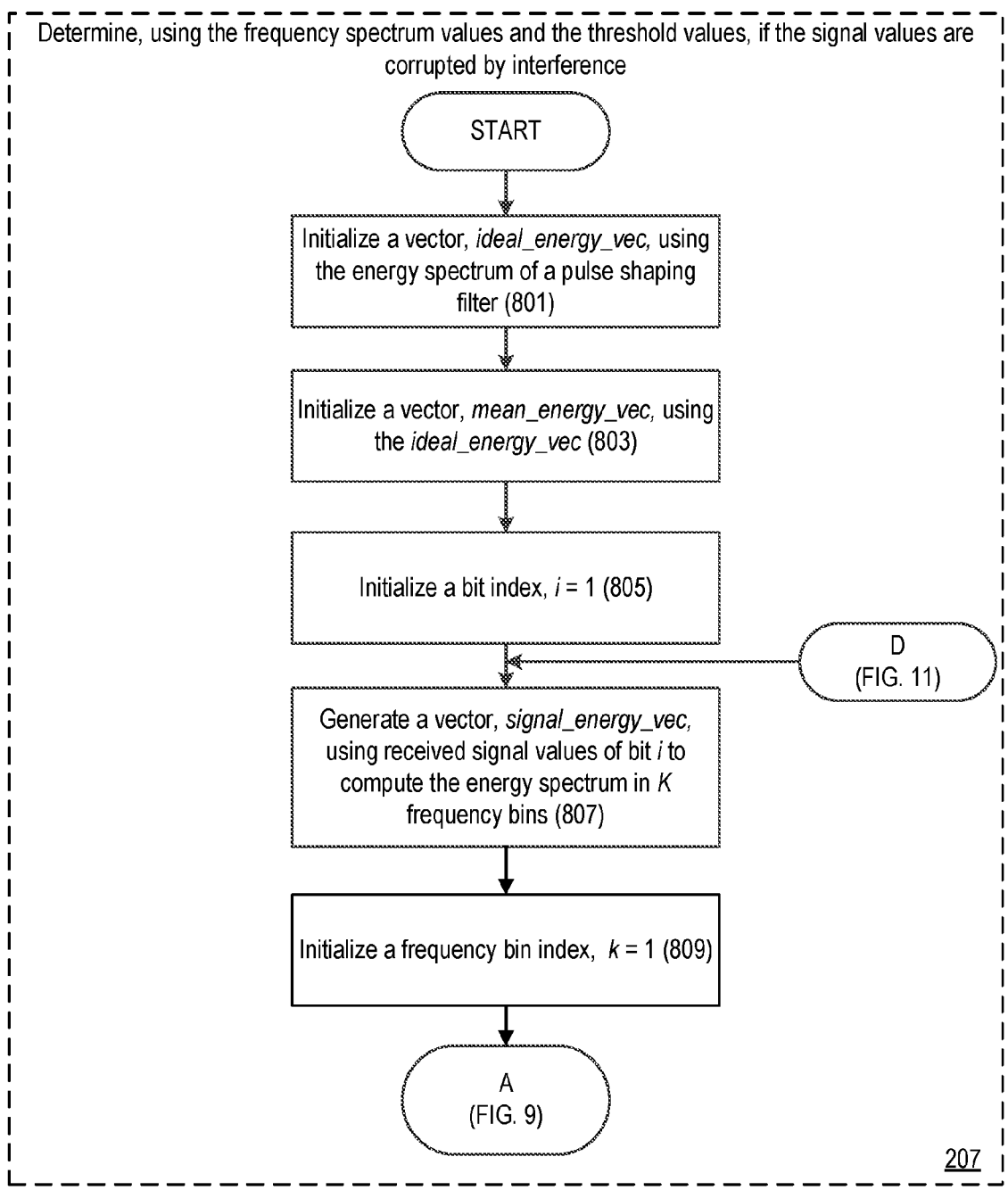
FIG. 8 depicts steps of initialization for an interference determination process.

FIG. 8 depicts steps of initialization for an interference determination process, which include: initializing a vector, ideal_energy_vec, using the energy spectrum of a pulse shaping filter (801); initializing a vector, mean_energy_vec, using the ideal_energy_vec (803); initializing a bit index, i=1 (805); generating a vector, signal_energy_vec, using received signal values of bit i to compute the energy spectrum in K frequency bins (807); and initializing a frequency bin index, k=1 (809). The energy spectrum of the pulse shaping filter is stored in the vector ideal_energy_vec. Alternatively, information based on the energy spectrum is stored in the vector ideal_energy_vec. In one such embodiment, the information in the vector ideal_energy_vec is the result of scaling the energy spectrum of the filter. Each value in the vector ideal_energy_vec is associated with one frequency bin. Initially (e.g. prior to setting a variable i=1, indicating the first bit), a vector mean_energy_vec having the same dimensions as the vector ideal_energy_vec is initialized using the values of the vector ideal_energy_vec. In one embodiment, the vector ideal_energy_vec is used to compute thresholds that are used to determine whether the received signal has been corrupted by interference. The values within the vector signal_energy_vec are initialized using the spectrum values 118 output from the spectrum analyzer 103 (e.g. a column vector of energy spectrum values corresponding to the time slot of bit i).

Interference Determination

Figure 9:
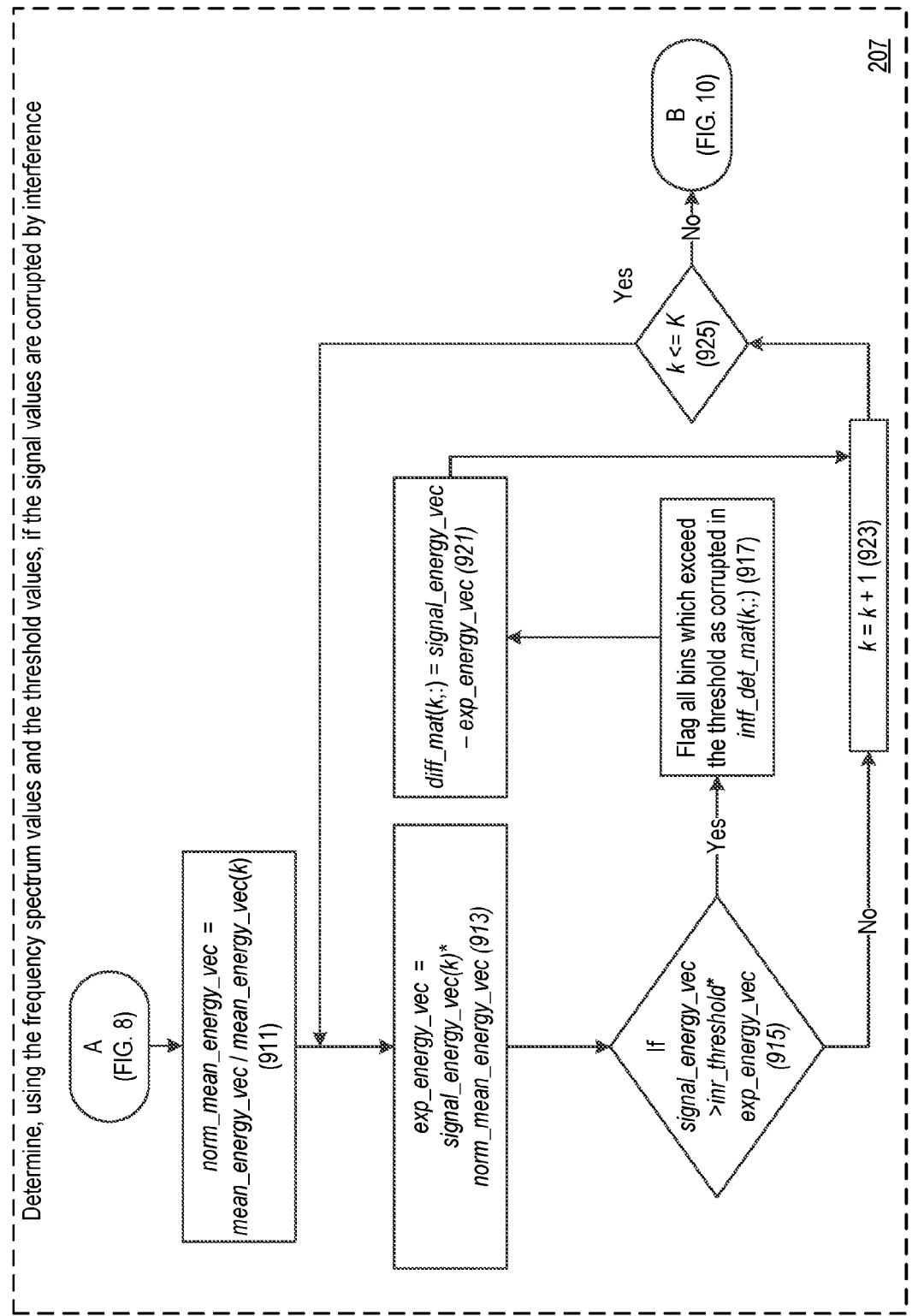
FIG. 9 depicts steps for an interference determination process.

FIG. 9 continues the interference determination process. As shown, the process flow proceeds from step 809 in FIG. 8 to step 911 of FIG. 9. A vector norm_mean_energy_vec is determined by dividing the current value of each element of the vector mean_energy_vec by the value of the $k^{th}$ element of the vector mean_energy_vec(k) (step 911). Accordingly, the value of each element of the vector mean_energy_vec (e.g. the amount of energy in each frequency bin) is set to a value normalized (e.g. set relative) to the amount of energy associated with the current frequency bin k. Since the value of the vector mean_energy_vec was set in step 803 to the value of the ideal output spectrum shaped by the transmit pulse shaping filter (e.g. the value of the vector ideal_energy_vec), each element of mean_energy_vec initially represents the relative amount of energy present in each of the frequency bins with respect to the energy level in frequency bin k as a consequence of the transmit signal having been filtered by the transmit pulse shaping filter.

For example, in a simplified case where the vector ideal_energy_vec has a dimension of 5×1, there are five elements representing the relative amount of energy that would be present at the output of a transmit pulse shaping filter if a broad band signal with equal amounts of energy over all frequencies is applied to the input of the filter. The mean_energy_vec is accordingly of dimension 5×1 and is initialized to the values of ideal_energy_vec. By way of example, if the values of the five elements of the mean_energy_vec are 1, 3, 5, 3, 1, the norm_mean_energy_vec values would be 1, 3, 5, 3, 1 when k is equal to 1, since each element of mean_energy_vec is divided by the value of the first element of mean_energy_vec (a value of 1). When k is equal to 2 (e.g. when the next frequency bin is to be processed), the values of mean_energy_vec are divided by the second element of mean_energy_vec (a value of 3), and the resulting values for the elements of norm_mean_energy_vec become 0.3, 1, 1.66, 1, 0.3. When the value of k is 3, the values of mean_energy_vec are divided by the third element of mean_energy_vec (a value of 5), and the resulting values for the elements of norm_mean_energy_vec are 0.2, 0.6, 1, 0.6, 0.2, and so on.

Once the vector norm_mean_energy_vec has been determined for the $k^{th}$ frequency bin, a vector exp_energy_vec is determined (step 913). The vector exp_energy_vec is the product of the value of the $k^{th}$ element of signal_energy_vec and the vector norm_mean_energy_vec. Accordingly, the norm_mean_energy_vec is scaled by the value that is actually received in that frequency bin. Once the exp_energy_vec is determined, the energy of the received signal in each frequency bin (e.g. signal_energy_vec) is compared to the value of exp_energy_vec scaled by the threshold value inr_threshold as determined by the threshold module 509 (step 915). Any values of signal_energy_vec that are greater than exp_energy_vec scaled by the threshold value inr_threshold are flagged as being corrupt (step 917). An element of a K×K matrix intf_det_mat is set for each frequency bin pointed to by k that is determined to be corrupt. In one embodiment, the difference between the amount of energy received (e.g. signal_energy_vec) and the amount of energy that was expected to be received (e.g. exp_energy_vec) is saved in a K×K matrix diff_mat (step 921). The variable k is then incremented to point to the next frequency bin (step 923). If there are no bins that exceeded the threshold (step 915), then the process goes directly to increment the variable k (step 923).

The matrices, intf_det_mat and diff_mat are used to determine how much interference is present in the $i^{th}$ bit. The diff_mat is a K×K matrix produced for each time segment (or 'bit') being processed. Similarly, intf_det_mat is also a K×K matrix produced for each time segment being processed. A frequency bin k is chosen, and a threshold vector exp_energy_vec is computed by normalizing and scaling the mean_energy_vec with respect to the power of the $k^{th}$ frequency bin. Then, the received signal_energy_vec is compared against the scaled threshold vector as described (step 915). Each of the frequency bins which exceed that threshold are flagged as 1 and saved in the $k^{th}$ row of intf_det_mat and the difference is accordingly stored at the $k^{th}$ row of diff_mat. Then, the $k^{th}+1$ frequency bin is chosen and the process is repeated (e.g. by normalizing and scaling the mean_energy_vec with respect to the power of the $k^{th}+1$ frequency bin). Frequency bins having values that exceed the corresponding threshold value are flagged as 1 and stored in the $k^{th}+1$ row of the intf_det_mat (step 917) and the difference computed at step 921 is stored in the $k^{th}+1$ row of the diff_mat, and so on for k=1, 2, 3, 4, . . . , K.

The information of vectors intf_det_mat and diff_mat information can be used to produce a scaling factor used to scale the received signal before it is processed by position determination module 111.

If the variable k has not hit the terminal value of K (e.g. the process has run for all frequency bins), then the process returns to step 913 and runs as noted above until the value of the variable k reaches the terminal value K (step 925). Once the terminal value K has been reached, the process moves to step 1027 shown in FIG. 10, which continues the interference determination process.

Figure 10:
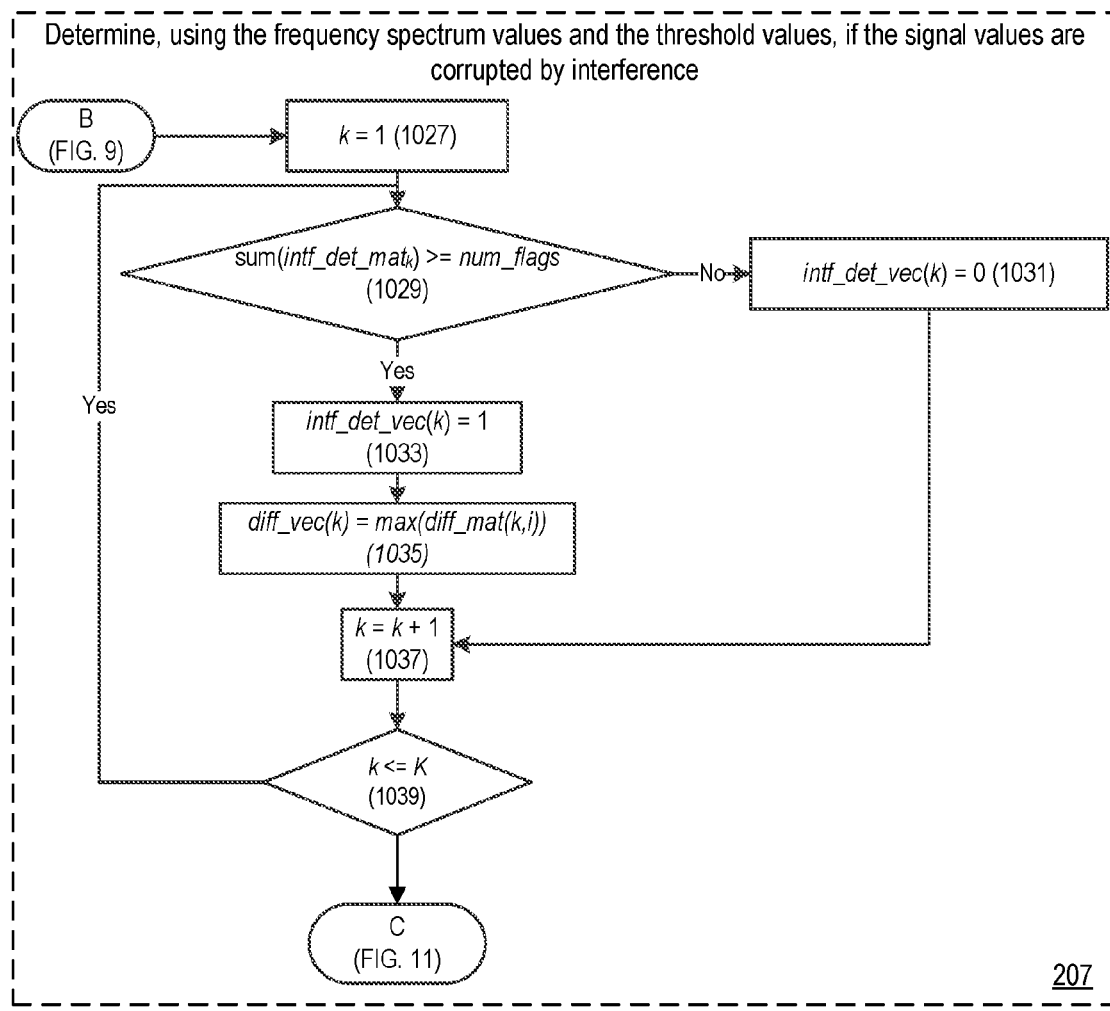
FIG. 10 depicts steps for an interference determination process.

As shown in FIG. 10, the value of k is reinitialized to 1 (step 1027). The sum of all of the elements in the $k^{th}$ column of the intf_det_mat denoted as sum(intf_det_mat$_k$) is compared to a value num_flags. The value of num_flags is the minimum number of times a frequency bin should be flagged as being corrupt before setting the $k^{th}$ value of a vector intf_det_vec to 1. If the minimum number has not been reached (step 1029), then the value for the $k^{th}$ element of intf_det_vec is set to zero (step 1031). However, if the $k^{th}$ frequency bin has been flagged at least num_flags number of times, the value of the $k^{th}$ element of intf_det_vec(k) is set to 1 (step 1033). In addition, the $k^{th}$ value of a vector diff_vec is set to the maximum value within the $k^{th}$ column of the matrix diff_mat (step 1035). The value of k is then incremented (step 1037). If the terminal value K has not been attained (step 1039), the process returns to step 1029 and continues to check whether each frequency bin 1, 2, . . . , K of the $i^{th}$ bit is corrupt, until the terminal value K is attained (step 1039). Upon attaining the terminal value K, the process moves to FIG. 11, which continues the interference determination process.

Figure 11:
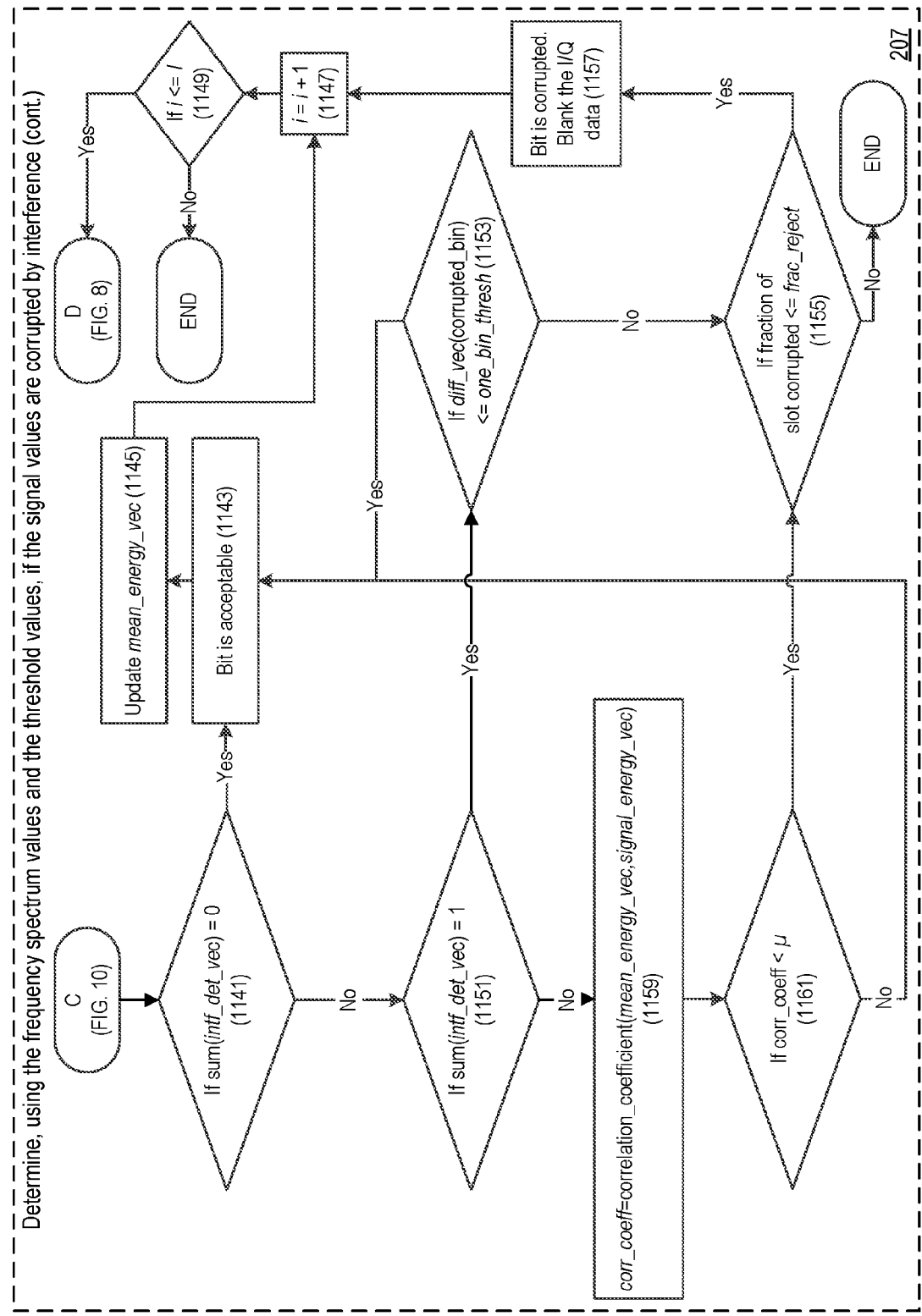
FIG. 11 depicts steps for an interference determination process.

As shown in FIG. 11, a determination is made as to whether the $i^{th}$ bit of the received signal is acceptable or not acceptable (e.g. corrupt). In one embodiment, the determination is made by first checking whether any of the elements of the vector intf_det_vec have been set. This is done by taking the sum of all of the elements in the vector (e.g. sum(intf_det_vec) and determining if the sum is equal to zero (step 1141). That is, if none of the bins of the bit have been deemed to be corrupt (and set to 1 at step 1033 of FIG. 10), then the sum will be zero and the $i^{th}$ bit is declared to be acceptable (step 1143). The energy spectrum values corresponding to the acceptable bit are then used to update the value of the vector mean_energy_vec (step 1145). The value of the variable i can then be incremented to point at the next bit (step 1147). If the terminal bit I has been processed, the process ends (step 1149). If, however, there are more bits to be processed, the process continues at step 807 in FIG. 8.

If any of the elements of the vector intf_det_vec have been set (e.g. sum(intf_det_vec) is not equal to zero), then a check is made to see whether there is only one bin within the bit that was determined to be corrupt (step 1151). That is, if the value of sum(intf_det_vec) is equal to 1, then a determination is made as to whether the corrupted bin has energy greater than a predetermined threshold referred to as one_bin_threshold. This is done by checking whether the value stored in diff_vec(corrupted_bin) is less than or equal to one_bin_threshold (step 1153). If so, the bit is determined to be acceptable and flow continues to step 1143. If in step 1153 the value of diff_vec(corrupted_bin) is determined to be greater than one_bin_threshold, a check is made to determine whether the number of bins that have been determined to be corrupt is less than or equal to a threshold value, frac_reject (step 1155). If so, that bit is declared to be corrupt (e.g. not acceptable) and the received signal data corresponding to that bit is blanked (e.g. set to zero) (step 1157). The value of i is then incremented (step 1147). As noted above, from step 1147, the process will either end if the terminal value for i has been reached, or continue by processing the next bit at step 807 of FIG. 8. Alternate processes for handling a corrupted bit at step 1157 is discussed later.

If, at step 1151, the value of the sum(intf_det_vec) is not equal to 1 (e.g. there have been more than one bin found to be corrupt), then a correlation coefficient is calculated between the value of the amount of energy received (signal_energy_vec) and the value of the vector mean_energy_vec (step 1159). If the resulting correlation coefficient is greater than or equal to a threshold value μ (step 1161), then the $i^{th}$ bit is determined to be acceptable (step 1143). The process then continues to step 1145 as noted above. That is, when there is a relatively high correlation between the signal energy and the mean energy vector, it can be assumed to be acceptable.

Alternatively, if the correlation coefficient of step 1159 is determined in step 1161 to be less than the threshold value μ, it can be assumed that interference is present in the signal. In this case, the process proceeds at step 1155 as discussed above.

Rejection of Identified Interference

If interference has been detected in a particular time-frequency bin of the matrix TF, one of a plurality of interference rejection methods can be applied by the interference rejection module 113, as is described with respect to step 209 of FIG. 2.

In one embodiment, the signal corresponding to a particular bit is "blanked" as follows:

$$O_i^{(n)}(t) = \begin{cases} 0 & i^{th} \text{ bit corrupted by interference} \\ O_i^{(n)}(t) & i^{th} \text{ bit clean} \end{cases} \quad (5)$$

$$i = 1, 2, \ldots, I$$

That is, the value of signal output from the front end 101 is set to zero for that particular bit for which the signal energy level is above the interference threshold. By setting the value of the bit to zero, the data associated with that bit is not used for further processing.

In another embodiment, the interference corresponding to the particular time-frequency bin can be removed via notch filtering (or any interference rejection filter).

In yet another embodiment, a scaling factor can be computed which is inversely proportional to the amount of interference contained in the particular time-frequency bin identified by the interference detection module 105. The received signal can then be appropriately 'weighted' before further processing. A received signal that contains interference may be weighted such that the received signal contributes less to a position determination process of the position determination module 111, while another received signal that contains little or no interference may be weighted such that the other received signal contributes more to the position determination process of the position determination module 111.

In still yet another embodiment, the correlation function of the corrupted bit is not used during integration. That is, a DSS-based positioning system may estimate the time delay of the received signal, $O_i^{(n)}(t)$, transmitted from a $n^{th}$ transmitter by correlating the received signal, $O_i^{(n)}(t)$, with a locally generated copy of the transmitted sequence, $c_n(t)$. This operation, in direct sequence spread spectrum based positioning system is often called de-spreading. The correlator output for all $O_i^{(n)}$ i=1, 2, . . . , I is then combined to get what is referred to as an "integrated correlation function" of the form:

$$C_n(t) = \Sigma_{i=1}^{I} O_i^{(n)} * c_n(t) \quad (6)$$

Thus, if the time duration (e.g. bit) that is processed by the interference detection module 105 is equal to that of one PN sequence, and that time duration is found to be corrupted, based on an indication from the interference detection module 105 the correlation function corresponding to that time duration will not be used in the integration process above. Alternatively, a scaling factor such as that previously described can also be used to weigh the correlation function before coherently integrating it.

Pseudorange Weighting for Improvements in the Positioning Domain

Interference detection and rejection in the time domain as described above improves TOA estimates of received positioning signals in the ranging domain. Aspects of these techniques may also be used to mitigate the effect of interference, and thus improve an estimated position, in the positioning domain.

In one embodiment, an interference presence metric $\beta_n$ corresponding to an $n^{th}$ transmitter is determined (e.g. using signal metrics of signals received from the $n^{th}$ transmitter) and the interference presence metric $\beta_n$ is then used to inform the position determination module 111 to assign less influence to a pseudorange measurement from the $n^{th}$ transmitter when that transmitter is experiencing substantial external interference. Likewise, the interference presence metric $\beta_n$ is used to inform the position determination module 111 to assign more influence to a pseudorange measurement from the $n^{th}$ transmitter when that transmitter is not experiencing substantial external interference.

Figure 12:
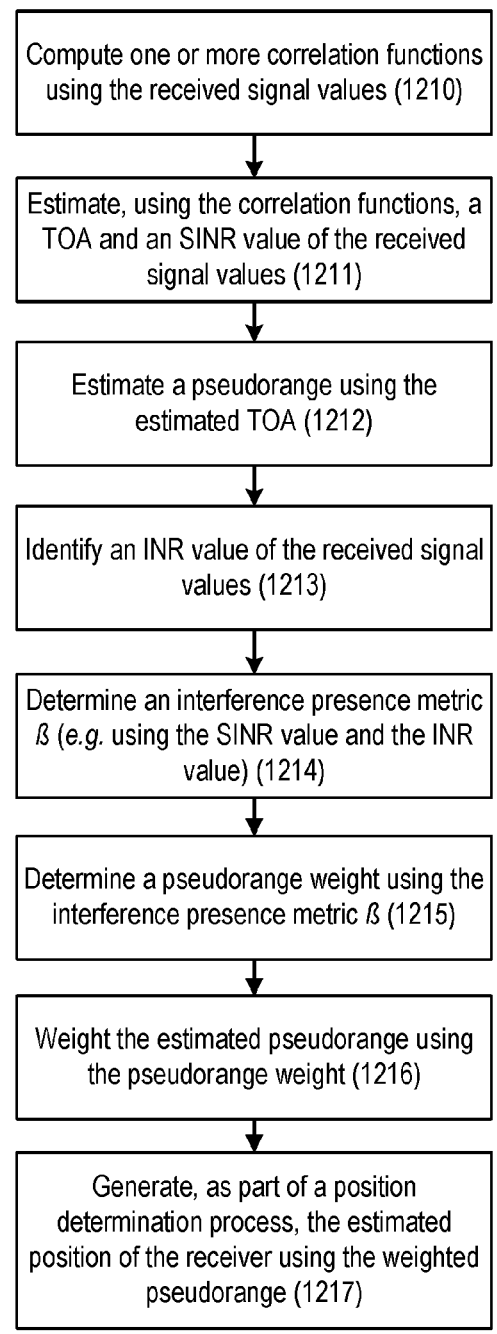
FIG. 12 depicts steps of a process for improving a position estimate in the positioning domain using an interference presence metric.

FIG. 12 depicts steps of a process for improving a position estimate in the positioning domain using the interference presence metric β. The steps of the process include: computing one or more correlation functions using the received signal values (step 1210); estimating, using the correlation functions, a TOA and a signal-to-interference-plus-noise ratio (SINR) value of the received signal values (step 1211); estimating a pseudorange using the estimated TOA (step 1212); identifying an interference-to-noise ratio (INR) value of the received signal values (step 1213); determining an interference presence metric β (e.g. using the SINR value and the INR value) (step 1214); determining a pseudorange weight using the interference presence metric β (step 1215); weighting the estimated pseudorange using the pseudorange weight (step 1216); and generating an estimated position of the receiver using the weighted pseudorange (step 1217).

Key information that may considered as part of developing the interference presence metric β includes percentage of data that is blanked (as was discussed with reference to FIG. 11), SINR in a time slot, INR in a time slot, the number of transmitters visible to the receiver, signal-to-noise ratio (SNR), and main-lobe to peak side-lobe ratio (MPSR).

The interference presence metric β may also be used in conjunction with any of the interference detection and mitigation techniques described herein. In one embodiment, a mathematical formulation of the interference presence metric $\beta_n$ is written as, $$\beta_n = \frac{p}{I} SINR_n - INR_n \quad (7)$$

where p is the number of bits blanked by the interference rejection module using methods described herein, I is the total number of bits transmitted by an $n^{th}$ transmitter, $SINR_n$ is the SINR of the correlation function corresponding to the $n^{th}$ transmitter, and $INR_n$ represents the INR of the non-blanked data corresponding to the $n^{th}$ transmitter. For each transmitter, the pseudorange measurements and corresponding interference presence metric $\beta_n$ may be provided to a trilateration function to generate an estimated position of the receiver.

Figure 13:
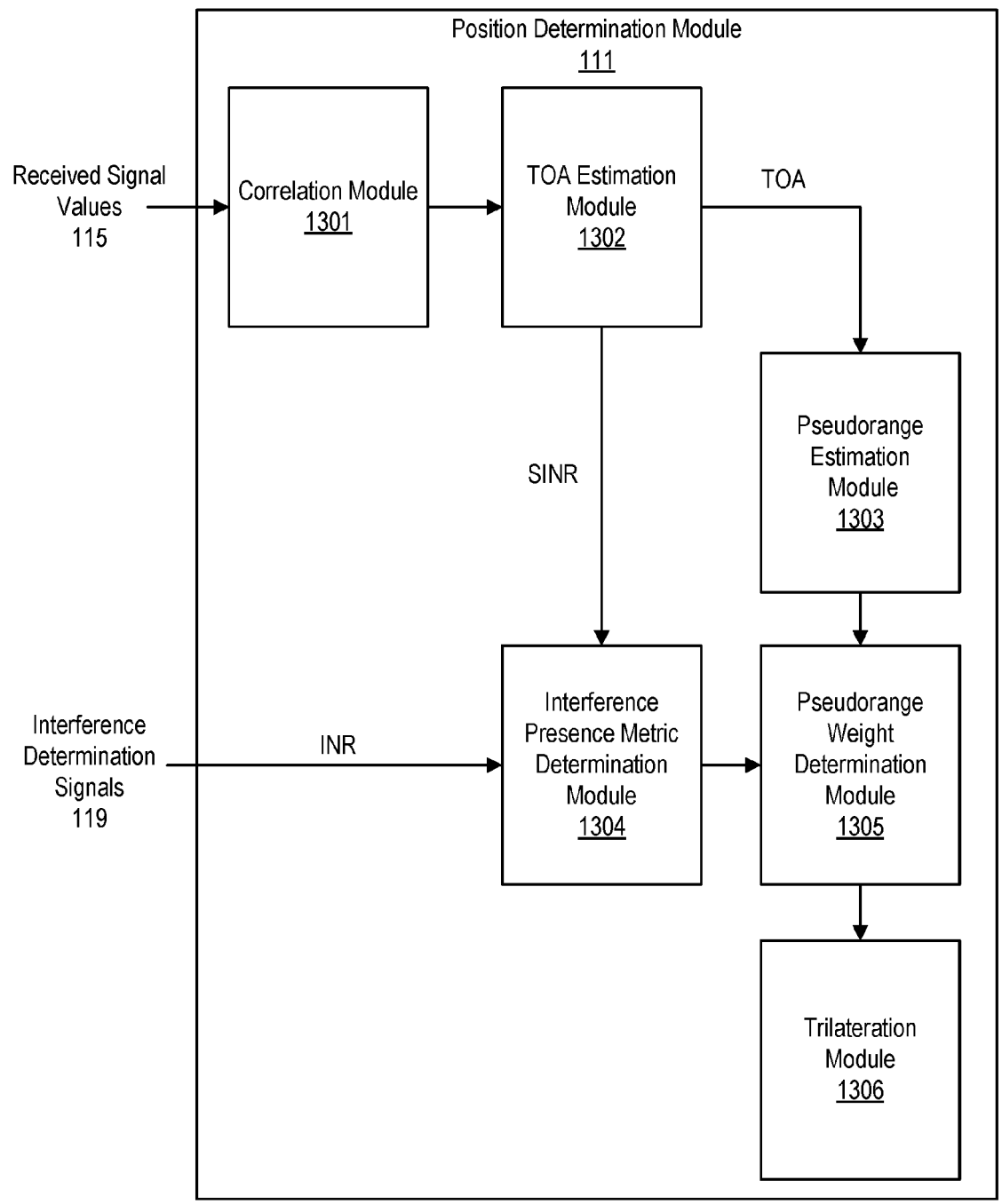
FIG. 13 illustrates an embodiment of a position determination module when used for improving a position estimate in the positioning domain.

Attention is now drawn to FIG. 13, which illustrates an embodiment of a position determination module 111 when used for improving a position estimate in the positioning domain. In the embodiment shown, the position determination module 111 includes: a correlation module 1301; a TOA estimation module 1302; a pseudorange estimation module 1303; an interference presence metric determination module 1304; a pseudorange weight determination module 1305; and a trilateration module 1306. As shown, the correlation module 1301 is coupled to the TOA estimation module 1302. The TOA estimation module 1302 is coupled to the pseudorange estimation module 1303, and is additionally coupled to the interference presence metric determination module 1304. The interference presence metric determination module 1304 is coupled to the pseudorange weight determination module 1305. The pseudorange estimation module 1303 is coupled to the pseudorange weight determination module 1305, and the pseudorange weight determination module 1305 is coupled to the trilateration module 1306. In the embodiment shown, the position determination module 111 receives received signal values 115 and interference determination signals 119.

The modules shown in FIG. 13 are operable to carry out one or more of the steps shown in FIG. 12. In one embodiment, the correlation module 1301 is operable to carry out step 1210. The TOA estimation module 1302 is operable to carry out step 1211. The pseudorange estimation module 1303 is operable to carry out step 1212. The interference detection module 105 (refer to FIG. 1), or the interference detection module 505 (refer to FIG. 5), is operable to carry out step 1213. The interference presence metric determination module 1304 is operable to carry out step 1214. The pseudorange weight determination module 1305 is operable to carry out step 1215 and 1216, and the trilateration module 1306 is operable to carry out step 1217.

Other Aspects

In digital communication systems, a short known sequence, often called a preamble, is transmitted in order to time synchronize transmitters and receivers of the digital communication system. Interference can severely hamper the detection of the preamble at the receiver, thereby degrading the synchronization performance. It is important to identify time boundaries of the received signal for the implementation of time-frequency detection and rejection of interference. The importance of the issue arises particularly when the time-frequency spectrum of the received signal is to be computed. To do that, the received signal is divided into different time segments where each time segment may be t seconds long, and the bandwidth of interest is divided into K frequency bins. In most TOA-based positioning systems, first a transmitter is 'acquired' by executing a detection and acquisition logic which searches for the PN sequence transmitted by that transmitter. Once a transmitter is 'acquired', the beginning and end of its signal transmission is also roughly known. For such a system, once one transmission of the signal is detected and acquired, and its time boundaries determined, a feedback loop may be employed from acquisition block back to the interference detection block to pass the determined time boundaries. Once the time boundaries of the signal of interest is determined, it can be used as the receiver receives successive transmissions of that signal to divide it into one or more time segments, starting from every transmitted signal's beginning till its end. Then, the time-frequency spectrum can be computed as described earlier Methods of this disclosure may be implemented by hardware, firmware or software. One or more non-transitory machine-readable media embodying program instructions that, when executed by one or more machines, cause the one or more machines to perform any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

By way of example, not by way of limitation, method(s), system(s) or other means may perform the following or be operable perform the following: receiving a signal from a transmitter; determining a plurality of receive signal time-frequency (RSTF) values, each RSTF value indicating the time-frequency spectrum of the received signal in a particular time slot and within a particular frequency bin; establishing a plurality of threshold values, each based upon a corresponding one of a plurality of expected energy values and each further associated with a corresponding one of the plurality of frequency bins; determining that all or a portion of the received signal is acceptable if a RSTF value of a frequency bin is below the threshold value corresponding to the frequency bin of the RSTF; producing, using the received signal and the determination, acceptable signal values, wherein the acceptable signal values are produced by performing one or both of generating acceptable signal values and identifying acceptable signal values; and estimating the position of the receiver using the acceptable signal values.

In one embodiment, the acceptable signal values comprise all or a portion of the received signal that are determined to be acceptable and do not comprise other portions of the received signal that are determined to be not acceptable. In one embodiment, the acceptable signal values comprise portions of the received signal that have been filtered to remove or lessen portions that are determined to be not acceptable. In one embodiment, the acceptable signal values comprise weighted portions of a received signal that are determined to be not acceptable. In one embodiment, the acceptable signal values comprise portions of a received signal that are not acceptable, and the portions of the received signal that are not acceptable are not used during integration of a correlation function.

In one embodiment, the plurality of threshold values includes a vector of values. In one embodiment, the vector of values are determined using the frequency response of a transmit pulse filter. In one embodiment, each of the elements of the vector of values is a scaled version of the frequency response of the transmit pulse filter associated with a respective frequency bin.

Method(s), system(s) or other means may further or alternatively perform the following or be operable to perform the following: receiving a plurality of pulse shape values, each of the plurality of pulse shape values associated with a corresponding one of the plurality of frequency bins; receiving a plurality of RSTF values associated with a plurality of frequency bin values that are below a plurality of corresponding threshold values, each of the plurality of RSTF values associated with a corresponding one of the plurality of frequency bins; and determining a plurality of current expected energy values, each current expected energy value associated with one of the plurality of frequency bins and based on the values of an associated one of the received pulse shape values and an associated one of the received RSTF values.

In one embodiment, each current threshold value is initially determined based on the pulse shape value associated with the frequency bin; and for each frequency bin, each of a plurality of subsequent threshold values is determined from both a current expected energy value for the associated frequency bin and at least one RSTF value associated with a frequency bin that is below a corresponding threshold value associated with the frequency bin. In one embodiment, the threshold value for each frequency bin is set to a value that is a predetermined number of Decibels greater than an expected energy value associated with the frequency bin.

In one embodiment, the received signal associated with a frequency bin is acceptable if each RSTF value associated with each other frequency bin in the same time slot is below the threshold.

In one embodiment, the plurality of expected energy values are based on a response of a transmit pulse shaping filter. In one embodiment, the response of the transmit pulse shaping filter is determined by an industry specification. In one embodiment, the expected energy values are only used for the RSTF values corresponding to a first bit of the received signal. In one embodiment, the expected energy value is weighted to determine the amount of influence the expected energy value will have on the threshold values. In one embodiment, the expected energy value is only used for determining the threshold value until a predetermined number of RSTF values have been received.

In one embodiment, the threshold values are updated using RSTF values. In one embodiment, the threshold values are updated by averaging received RSTF values with current threshold values. In one embodiment, the threshold values are updated using only acceptable RSTF values.

Systems comprising one or more modules that perform or are operable to perform different method steps/stages disclosed herein are also contemplated, where the modules are implemented using one or more machines listed herein or other suitable hardware.

In one embodiment, one or more systems include: a front end having an output, wherein the front end receives a signal from a transmitter and outputs a received signal; a spectrum analyzer having an input and an output, the input coupled to the front end and the output providing a plurality of receive signal time-frequency (RSTF) values, each RSTF value indicating the time-frequency spectrum of the received signal in a particular time slot and within a particular frequency bin; a threshold module having an output through which a plurality of threshold values are output, wherein the threshold module establishes a plurality of threshold values, wherein each of the plurality of threshold values are based upon a corresponding one of a plurality of expected energy values and further associated with a corresponding one of the plurality of frequency bins; an interference detection module having a first input for receiving the threshold values from the threshold module, a second input coupled to the spectrum analyzer, and an output operable to provide an indication if all or a portion of the received signal is acceptable, wherein the interference detection module determines if all or a portion of the received signal is acceptable if a RSTF value of a frequency bin is below the threshold value corresponding to the frequency bin of the RSTF; an interference rejection module having a first input coupled to the output of the front end, and second input for receiving the determination of whether all or a portion of the received signal is acceptable, and an output for outputting acceptable signal values, wherein the interference rejection module produces acceptable signal values by performing one or both of generating acceptable signal values or identifying acceptable signal values; and a position determination module having a first input coupled to the output of the interference rejection module for receiving the acceptable signal, wherein the position determination module estimates the position of the receiver using the acceptable signal values.

The one or more systems may further or alternatively include: a pulse shape module having an output; and an averaging module having an output coupled to the interference detection module, a first input coupled to the pulse shape module, and a second input coupled to the output of the interference detection module, wherein: the averaging module receives, from the pulse shape module, a plurality of pulse shape values, each of the plurality of pulse shape values associated with a corresponding one of the plurality of frequency bins; the averaging module receives, from the interference detection module, a plurality of RSTF values associated with a plurality of frequency bin values that are below a plurality of corresponding threshold values, each of the plurality of RSTF values associated with a corresponding one of the plurality of frequency bins; and the averaging module determines a plurality of current expected energy values, each current expected energy value associated with one of the plurality of frequency bins and based on the values of an associated one of the received pulse shape values and an associated one of the received RSTF values.

In one embodiment, the interference detection module outputs an indication that the received signal associated with a frequency bin is acceptable if each RSTF value associated with each other frequency bin in the same time slot is below the threshold.

When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems (e.g., satellites, other transmitters, receivers, a server); RF front end module(s) with circuitry components (e.g., analog/digital logic and power circuitry, tuning circuitry, buffer and power amplifiers, and other components as is known in the art or otherwise disclosed herein); processing module(s) for performing signal processing (e.g., generating signals for transmission to other systems at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other conditions); and/or interface module(s) for exchanging information with other systems via other links other than a radio link. Signals transmitted by a transmitter may carry different information that, once determined by a receiver or a server, may identify the following: the transmitter that transmitted the signal; the location (LLA) of that transmitter; pressure, temperature, humidity, and other conditions at or near that transmitter; and/or other information.

A receiver may be in the form of a computing device (e.g., a mobile phone, tablet, laptop, digital camera, tracking tag). A receiver may also take the form of any component of the computing device, including a processor. By way of example, a receiver may include: antenna module(s) for exchanging signals with other systems (e.g., satellites, terrestrial transmitters, receivers); RF front end module(s) with circuitry components (e.g., mixers, filters, amplifiers, digital-to-analog and analog-to-digital converters as is known in the art or otherwise disclosed herein); processing module(s) for signal processing of received signals to determine position information (e.g., times of arrival or travel time of received signals, atmospheric information from transmitters, and/or location or other information associated with each transmitter), for using the position information to compute an estimated position of the receiver, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver (e.g., pressure, temperature, humidity, wind), which may be compared to the same environmental conditions at or near transmitters to determine the altitude of the receiver; other sensor module(s) for measuring other conditions (e.g., acceleration, velocity, orientation, light, sound); interface module(s) for exchanging information with other systems via other links other than a radio link; and/or input/output module(s) for permitting a user to interact with the receiver. Processing by the receiver can also occur at a server.

It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

RELATED APPLICATIONS

This application relates to the following related application(s): U.S. Pat. Appl. No. 62/301,448, filed 29 Feb. 2016, entitled INTERFERENCE DETECTION AND REJECTION FOR WIDE AREA POSITIONING SYSTEMS; U.S. Pat. Appl. No. 62/301,456, filed 29 Feb. 2016, entitled INTERFERENCE DETECTION AND REJECTION FOR WIDE AREA POSITIONING SYSTEMS. The content of each of the related application(s) is hereby incorporated by reference herein in its entirety.

The invention claimed is:

1. A method for detecting and mitigating the effects of interference, the method comprising:
   a) receiving a signal at a receiver;
   b) determining a plurality of received signal time-frequency (RSTF) values, each RSTF value indicating the time-frequency spectrum of the received signal in a particular time slot and within a particular frequency bin;
   c) establishing a plurality of threshold values, each threshold value based upon at least one of a plurality of expected energy values and each further associated with at least one of the frequency bins;
   d) determining that all or a portion of the received signal is acceptable if a RSTF value of a frequency bin is below the threshold value corresponding to that frequency bin of that RSTF value;
   e) producing, using the received signal and the determination that all or a portion of the received signal is acceptable, acceptable signal values, wherein the acceptable signal values are produced by performing one or both of generating the acceptable signal values or identifying the acceptable signal values; and
   f) estimating the position of the receiver using the acceptable signal values.

2. The method of claim 1, wherein the acceptable signal values comprise one or more portions of the received signal that are determined to be acceptable and do not comprise other portions of the received signal that are determined to be not acceptable.

3. The method of claim 1, wherein the acceptable signal values comprise one or more portions of the received signal that have been filtered to remove or lessen portions that are determined to be not acceptable.

4. The method of claim 1, wherein the acceptable signal values comprise weighted portions of the received signal that are determined to be not acceptable.

5. The method of claim 1, wherein the acceptable signal values comprise portions of the received signal that are not acceptable, and wherein the portions of the received signal that are not acceptable are not used during integration of a correlation function.

6. The method of claim 1, wherein the plurality of threshold values includes a vector of values.

7. The method of claim 6, wherein the method comprises: determining the vector of values using a frequency response of a transmit pulse filter.

8. The method of claim 7, wherein each element of the vector of values is a scaled version of the frequency response of the transmit pulse filter associated with a respective frequency bin.

9. The method of claim 1, the method comprising:
a) receiving a RSTF value, from the plurality of RSTF values, of a first frequency bin that is below a threshold value associated with the first frequency bin;
b) receiving a first pulse shape value associated with the first frequency bin; and
c) determining a threshold value associated with the first frequency bin, wherein the threshold value is based on the first pulse shape value and the received RSTF value of the first frequency bin.

10. The method of claim 9, wherein the plurality of threshold values include an initial threshold value that is associated with a frequency bin in a first bit and that is determined based on a pulse shape value associated with the frequency bin of the first bit, wherein the method comprises:
determining an updated threshold value that is associated with the frequency bin in a second bit that is subsequent to the first bit, wherein the updated threshold value is determined based on a current expected energy value associated with the frequency bin and at least one RSTF value associated with the frequency bin.

11. The method of claim 10, wherein the updated threshold value is based on a value that is a predetermined number of Decibels greater than the current expected energy value associated with the frequency bin.

12. The method of claim 1, wherein the method comprises:
determining that at least a portion of the received signal is acceptable when at least each of the frequency bins in a single time slot includes an RSTF value indicating the time-frequency spectrum of the received signal within the frequency bin that is below a threshold value that is associated with the frequency bin.

13. The method of claim 1, wherein the plurality of expected energy values are based on a response of a transmit pulse shaping filter.

14. The method of claim 1, wherein the plurality of threshold values include threshold values that are used to determine if RSTF values of frequency bins in a bit are below those threshold values, and wherein the method comprises:
determining an updated threshold value that is used to determine if a RSTF value of a frequency bin in a subsequent bit is below the updated threshold value, wherein the updated threshold value is determined by averaging a RSTF value of a frequency bin in the bit with an expected energy value.

15. The method of claim 14, wherein the expected energy value is weighted to control the amount of influence the expected energy value has on the updated threshold value.

16. The method of claim 1, wherein the plurality of threshold values include threshold values that are used to determine if RSTF values of frequency bins in a bit are below those threshold values, and wherein the method comprises:
determining an updated threshold value that is used to determine if a RSTF value of a frequency bin in a subsequent bit is below that updated threshold value, wherein the updated threshold value is determined using a RSTF value of a frequency bin in the bit that is below a threshold value associated with that frequency bin in the bit, and wherein the updated threshold value is determined without using an expected energy value of the frequency bin in the subsequent bit.

17. The method of claim 16, wherein the bit is a first bit of a plurality of bits, and the subsequent bit is a second bit of the plurality of bits.

18. The method of claim 1, wherein the method comprises:
determining updated threshold values using expected energy values until a predetermined number of RSTF values have been received, and not using expected energy values to determine updated threshold values after the predetermined number of RSTF values have been received.

19. One or more non-transitory machine-readable media embodying program instructions that, when executed by one or more machines, cause the one or more machines to perform a method for detecting and mitigating the effects of interference, the method comprising:
a) receiving a signal at a receiver;
b) determining a plurality of received signal time-frequency (RSTF) values, each RSTF value indicating the time-frequency spectrum of the received signal in a particular time slot and within a particular frequency bin;
c) establishing a plurality of threshold values, each threshold value based upon at least one of a plurality of expected energy values and each further associated with at least one of the frequency bins;
d) determining that all or a portion of the received signal is acceptable if a RSTF value of a frequency bin is below the threshold value corresponding to that frequency bin of that RSTF value;
e) producing, using the received signal and the determination that all or a portion of the received signal is acceptable, acceptable signal values, wherein the acceptable signal values are produced by performing one or both of generating the acceptable signal values or identifying the acceptable signal values; and
f) estimating the position of the receiver using the acceptable signal values.

20. A system for detecting and mitigating the effects of interference, the system comprising:
a) a receiver that includes a front end having an output, wherein the front end receives a signal from a transmitter;
b) a spectrum analyzer having an input and an output, the input coupled to the front end and the output providing a plurality of received signal time-frequency (RSTF) values, each RSTF value indicating the time-frequency spectrum of the received signal in a particular time slot and within a particular frequency bin;
c) a threshold module having an output through which a plurality of threshold values are output, wherein the threshold module establishes the plurality of threshold values, wherein each of the plurality of threshold values are based upon a corresponding one of a plurality of expected energy values and further associated with a corresponding one of the frequency bins;
d) an interference detection module having a first input for receiving the threshold values from the threshold module, a second input coupled to the spectrum analyzer, and an output operable to provide an indication if all or a portion of the received signal is acceptable, wherein the interference detection module determines if all or a portion of the received signal is acceptable if a RSTF value of a frequency bin is below the threshold value corresponding to that frequency bin of that RSTF value;

e) an interference rejection module having a first input coupled to the output of the front end, a second input for receiving the determination of whether all or a portion of the received signal is acceptable, and an output for outputting acceptable signal values, wherein the interference rejection module produces acceptable signal values by performing one or both of generating the acceptable signal values or identifying the acceptable signal values; and f) a position determination module having a first input coupled to the output of the interference rejection module for receiving the acceptable signal values, wherein the position determination module estimates the position of the receiver using the acceptable signal values.

\* \* \* \* \*